US008533778B1

(12) United States Patent
Dalcher (10) Patent No.: US 8,533,778 B1
(45) Date of Patent: Sep. 10, 2013

(54) SYSTEM, METHOD AND COMPUTER PROGRAM PRODUCT FOR DETECTING UNWANTED EFFECTS UTILIZING A VIRTUAL MACHINE

(75) Inventor: Gregory William Dalcher, Tigard, OR (US)

(73) Assignee: McAfee, Inc., Santa Clara, CA (US)

( * ) Notice: Subject to any disclaimer, the term of this patent is extended or adjusted under 35 U.S.C. 154(b) by 1139 days.

(21) Appl. No.: 11/473,920

(22) Filed: Jun. 23, 2006

(51) Int. Cl.
*G06F 7/00* (2006.01)

(52) U.S. Cl.
USPC ............ 726/2; 726/23; 726/26; 713/193; 711/6

(58) Field of Classification Search
USPC ............. 726/2, 26, 23; 713/193; 711/6
See application file for complete search history.

(56) References Cited

U.S. PATENT DOCUMENTS

| | | | | |
|---|---|---|---|---|
| 5,572,694 A * | 11/1996 | Uchino | ............................ | 718/1 |
| 6,795,923 B1 * | 9/2004 | Stern et al. | ...................... | 726/12 |
| 6,795,966 B1 | 9/2004 | Lim et al. | ........................... | 718/1 |
| 6,895,416 B2 * | 5/2005 | Gara et al. | ............................ | 1/1 |
| 7,124,197 B2 * | 10/2006 | Ocepek et al. | ................ | 709/232 |
| 7,475,420 B1 * | 1/2009 | Hernacki | ........................... | 726/2 |
| 7,490,355 B2 * | 2/2009 | Wong | ............................ | 726/24 |
| 7,539,857 B2 * | 5/2009 | Bartlett et al. | ................ | 713/152 |
| 2002/0019941 A1 * | 2/2002 | Chan et al. | ........................ | 713/185 |
| 2002/0129281 A1 * | 9/2002 | Hatfalvi et al. | .............. | 713/201 |
| 2003/0101381 A1 * | 5/2003 | Mateev et al. | .................. | 714/38 |
| 2003/0110258 A1 * | 6/2003 | Wolff et al. | ................... | 709/225 |
| 2003/0182435 A1 * | 9/2003 | Redlich et al. | ................ | 709/229 |
| 2004/0054928 A1 * | 3/2004 | Hall | .............................. | 713/201 |
| 2004/0064732 A1 * | 4/2004 | Hall | .............................. | 713/201 |
| 2004/0162947 A1 * | 8/2004 | Hooker | ......................... | 711/132 |
| 2004/0172557 A1 * | 9/2004 | Nakae et al. | ................... | 713/201 |
| 2004/0255138 A1 * | 12/2004 | Nakae | ............................ | 713/193 |
| 2005/0198285 A1 * | 9/2005 | Petit | .............................. | 709/225 |
| 2005/0216759 A1 | 9/2005 | Rothman et al. | .............. | 713/200 |
| 2005/0276228 A1 * | 12/2005 | Yavatkar et al. | .............. | 370/242 |
| 2006/0010209 A1 * | 1/2006 | Hodgson | ....................... | 709/206 |
| 2006/0020781 A1 * | 1/2006 | Scarlata et al. | .............. | 713/100 |
| 2006/0080656 A1 * | 4/2006 | Cain et al. | ...................... | 717/174 |
| 2006/0137010 A1 * | 6/2006 | Kramer et al. | ................... | 726/22 |
| 2006/0143688 A1 * | 6/2006 | Futoransky et al. | .............. | 726/1 |
| 2006/0179157 A1 * | 8/2006 | Huang | ........................... | 709/238 |
| 2006/0230401 A1 * | 10/2006 | Grawrock | ......................... | 718/1 |
| 2007/0055711 A1 * | 3/2007 | Polyakov et al. | ............. | 707/203 |
| 2007/0067844 A1 * | 3/2007 | Williamson et al. | ........... | 726/24 |
| 2007/0150874 A1 * | 6/2007 | Sharma et al. | ................ | 717/136 |
| 2007/0162909 A1 * | 7/2007 | Bahl et al. | ...................... | 718/104 |
| 2007/0250928 A1 * | 10/2007 | Boney | ............................. | 726/24 |
| 2008/0005782 A1 * | 1/2008 | Aziz | .............................. | 726/3 |
| 2008/0177994 A1 * | 7/2008 | Mayer | ............................. | 713/2 |
| 2009/0086979 A1 * | 4/2009 | Brutch et al. | ................. | 380/279 |
| 2011/0093951 A1 * | 4/2011 | Aziz | .............................. | 726/24 |

* cited by examiner

*Primary Examiner* — Beemnet Dada
*Assistant Examiner* — Sayed Beheshti Shirazi
(74) *Attorney, Agent, or Firm* — Wong Cabello Lutsch Rutherford & Brucculeri, LLP (57) ABSTRACT

A security system, method and computer program product are provided. In use, a request destined to a target computer is received, utilizing a virtual machine. The request is processed to identify an unwanted effect associated therewith, utilizing the virtual machine. In addition, the target computer is allowed access to the request, based on the processing.

20 Claims, 6 Drawing Sheets

SYSTEM, METHOD AND COMPUTER PROGRAM PRODUCT FOR DETECTING UNWANTED EFFECTS UTILIZING A VIRTUAL MACHINE

FIELD OF THE INVENTION

The present invention relates to security applications, and more particularly to applications for detecting unwanted code and associated effects.

BACKGROUND

Increasingly, computer systems have needed to protect themselves against unwanted code. Such unwanted code has generally taken the form of viruses, worms, Trojan horses, spyware, adware, and so forth. The damage and/or inconvenience capable of being incurred by these types of unwanted code has ranged from mild interference with a program, such as the display of an unwanted political message in a dialog box, to the complete destruction of contents on a hard drive, and even the theft of personal information.

Many mechanisms have been created in order to provide the much needed protection from such unwanted code and the effects thereof. For example, firewalls, intrusion detection/prevention software, scanners, spyware, etc. have been used to guard against various types of unwanted code. In use, a firewall typically blocks various network communications based on a predetermined set of rules. Still yet, scanners traditionally scan computer code when such code is accessed and/or on an on-demand basis.

Manufactures of these and other mechanisms are continuously striving to develop technology that provides "zero-day" protection or technology that provides similar protection. Unfortunately, despite such efforts, various types of unwanted code continue to circumvent such mechanisms, potentially causing damage before being detected. One difficulty with detecting such unwanted code involves the fact that any effect of its presence may not be detected before the unwanted code has already compromised an associated system.

There is thus a need for overcoming these and/or other problems associated with the prior art.

SUMMARY

A security system, method and computer program product are provided. In use, a request destined to a target computer is received, utilizing a virtual machine. The request is processed to identify an unwanted effect associated therewith, utilizing the virtual machine. In addition, the target computer is allowed access to the request, based on the processing.

DETAILED DESCRIPTION

Figure 1:
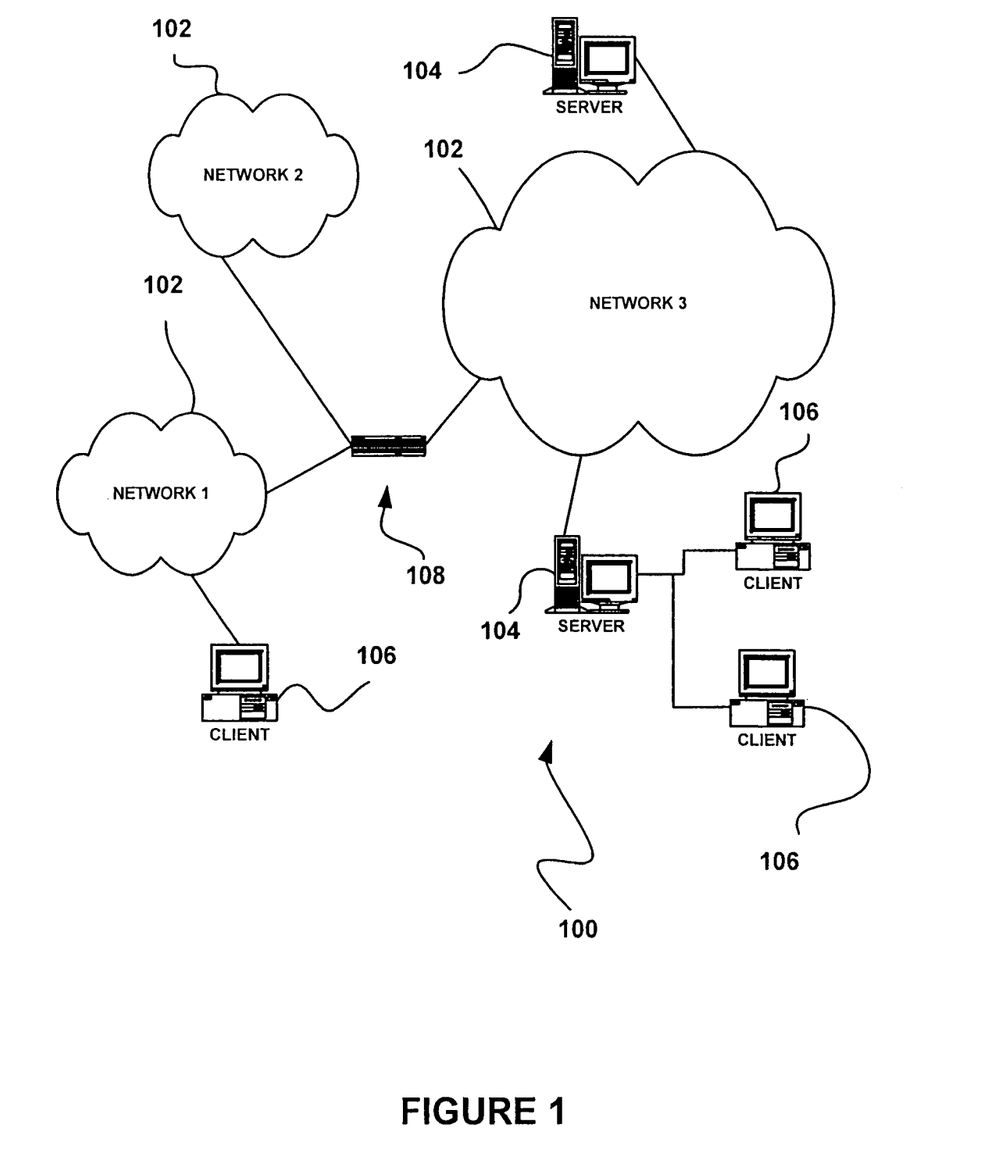
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a desktop computer, lap-top computer, hand-held computer, mobile phone, personal digital assistant (FDA), peripheral (e.g. printer, etc.), any component of a computer, and/or any other type of logic. In order to facilitate communication among the networks 102, at least one gateway 108 is optionally coupled therebetween.

Figure 2:
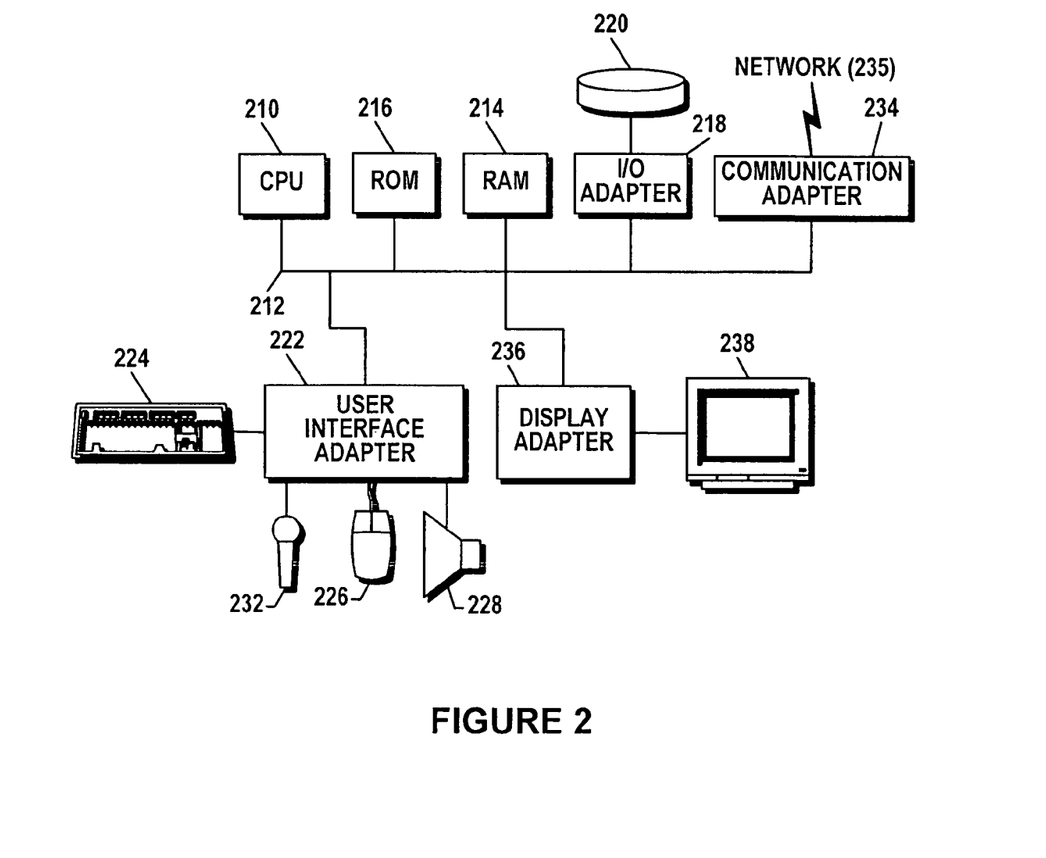
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238. For example, a computer readable medium may include the RAM 214, the ROM 216, the disk storage units 220, etc.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
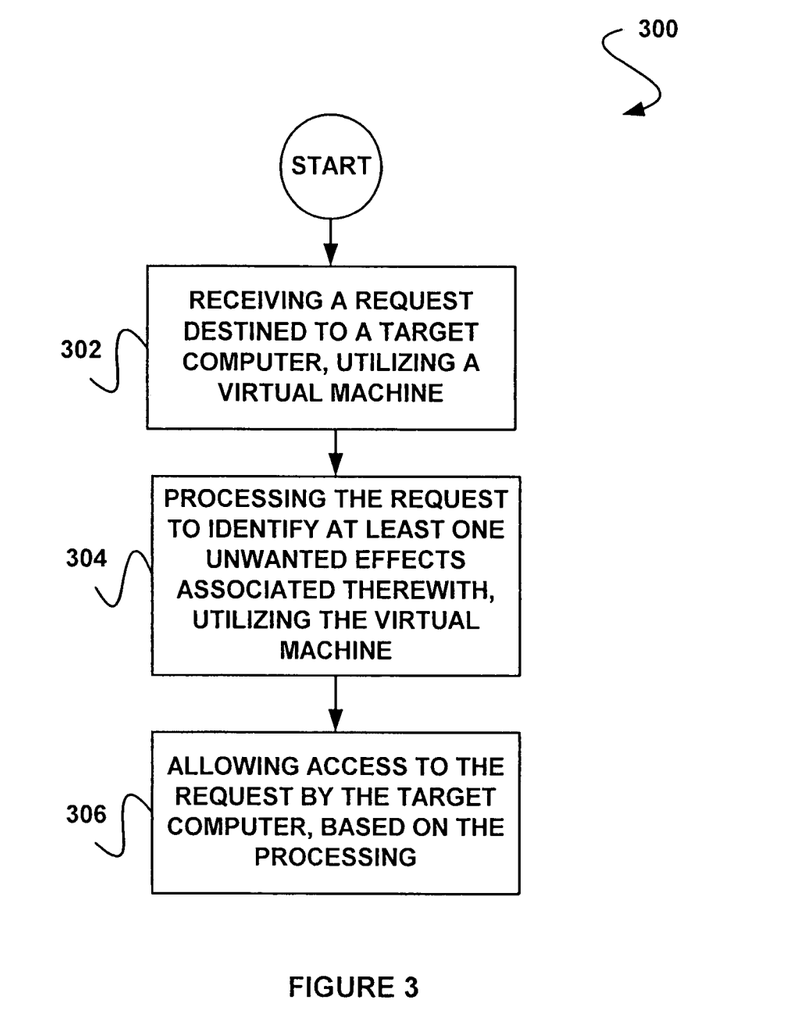
FIG. 3 shows a method for detecting unwanted effects utilizing a virtual machine, in accordance with one embodiment.

FIG. 3 shows a method 300 for detecting unwanted effects utilizing a virtual machine, in accordance with one embodiment. As an option, the method 300 may be implemented in the context of the architecture and environment of FIGS. 1 and/or 2. Of course, however, the method 300 may be carried out in any desired environment.

As shown in operation 302, a request destined to a target computer is received, utilizing a virtual machine. The request may include any request capable of being transmitted to the target computer. For example, in some optional embodiments, the request may include a domain name server (DNS) request, a request for a resource (e.g. data, processing of some sort, etc.), etc. As an option, the request may be received over a network. Of course, other channels of receipt (e.g. via portable memory, etc.) are also contemplated.

In one optional embodiment, the request may be received from a server computer. Of course, however, the request may be received from any computer capable of transmitting a request. For instance, the request may be received by any of the computers described above with respect to FIGS. 1 and/or 2.

Additionally, the target computer may include any computer capable of receiving a request. For example, the target computer may also include any of the computers described above with respect to FIGS. 1 and/or 2. Still yet, in one optional embodiment, the target computer may include any computer that is desired to be protected from unwanted effects.

In the context of the present description, the virtual machine utilized to receive the request may include an operating environment working in conjunction with, yet independent of, the target computer. In terms of examples, the virtual machine may include a VMWare® system, Microsoft's® Virtual PC system, and/or any other system capable of providing a virtual machine. As another option, the virtual machine may include hardware for hosting the aforementioned software.

In one embodiment, the virtual machine may be installed on the target computer, and may include software on the target computer that acts independently from the target computer's primary operating system. Moreover, in other embodiments, the virtual machine may optionally be integrated with an integrated (or separate) intrusion prevention system (IPS), an antivirus security system and/or any other security system capable of detecting unwanted code.

In still other embodiments, the virtual machine may include a separate computer in communication with the target computer. Specifically, the virtual machine may be installed on an intermediate computer that is networked between the target computer and an external computer from which the request is received.

In other embodiments, the virtual machine may be capable of hosting at least one type of operating system (e.g. Windows®, Linux®, etc.), The virtual machine may also mirror the target computer (e.g. hardware, data, registries, software, etc.). In addition, the virtual machine may be capable of taking snapshots of the operating system. Such snapshots may include, for example, exact back-up images of the virtual machine. Specifically, the snapshots may include instances of data, software, registries, etc. within the virtual machine. In this way, the snapshots may be utilized for purposes of back-up, restore and/or recovery.

Next, as shown in operation 304, the request is processed to identify at least one unwanted effect associated therewith, utilizing the virtual machine. In one embodiment, the request may be processed by performing an action in response to and in accordance with the request. In particular, the request may be performed on the virtual machine. For instance, the request may be processed utilizing the virtual machine in the same or similar manner that the request would be processed on the target machine. Of course, any type of processing which results in the identification of the unwanted effect(s) may be employed.

In this way, unwanted effects of the processed request may be identified by way of the virtual machine. In one embodiment, the unwanted effects may include any malicious activity and/or code resulting from the processed request. The malicious activity and/or code may, in turn, optionally include attacks, viruses, worms, spyware, etc. Of course, in the context of the present description, the unwanted effect may be more benign and further include any effect that is at least potentially unwanted.

Moreover, in different embodiments, the unwanted effects may be identified utilizing signatures, heuristics, behavioral IPS detection techniques and/or any other technique capable of identifying unwanted effects. As an option, the unwanted effects may be further identified in less than one second. Thus, sufficient time may be provided for detecting various classes of unwanted effects while preventing problems associated with latency in forwarding the requests to the target compute; as will soon become apparent. Of course, however, it should be noted that the unwanted effects may be identified within any desired time period.

Still yet, the target computer may be allowed access to the request, based on the processing. See operation 306. For example, in one embodiment where no unwanted effects are identified in operation 304, the original request may be transmitted to the target computer.

If however, at least one unwanted effect is identified in operation 304, access to the request by the target computer may be denied. As an option, the target computer may even be notified of the request and its associated unwanted effects. Of course, any actions may or may not be taken in response to the identification of any unwanted effects.

For example, the actions may include quarantining the request, deleting the request, cleaning the request, etc. Examples of such actions will be described in more detail with respect to FIG. 6. In this way, the targeted computer may be protected from the propagation of any unwanted effects associated with the request.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
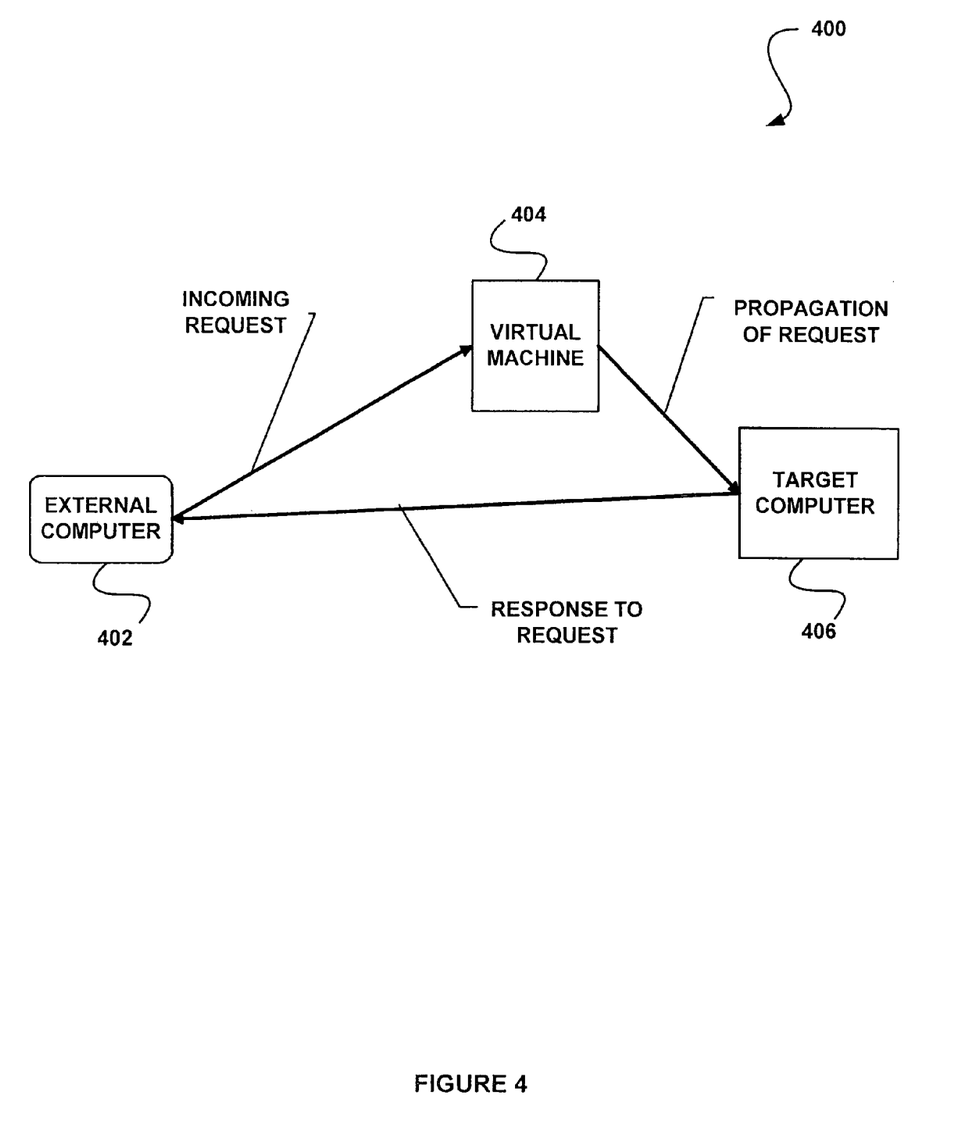
FIG. 4 shows a system for detecting unwanted effects utilizing a virtual machine, in accordance with another embodiment.

FIG. 4 shows a system 400 for detecting unwanted effects utilizing a virtual machine, in accordance with another embodiment. As an option, the system 400 may be implemented in the context of the architecture and environment of FIGS. 1-3. Of course, however, the system 400 may be carried out in any desired environment. It should also be noted that the aforementioned definitions may apply during the present description.

As shown, an external computer 402 initiates a transmission of a request to a target computer 406. The request is intercepted by a virtual machine 404. The request may then be processed, utilizing the virtual machine 404.

If the processing of the request at the virtual machine 404 results in unwanted effects propagated onto the virtual machine 404, the virtual machine 404 may prevent the request from being transmitted to the target computer 406. Thus, the unwanted effects may be prevented from being propagated onto the target computer 406.

In addition, the virtual machine 404 may revert to a prior state in which the virtual machine 404 itself was not propagated with the unwanted effects. For example, the virtual machine 404 may revert to the prior state utilizing a snapshot, rollback, etc. Such reversion will be described in more detail with respect to FIG. 6.

If, however, the processing of the request at the virtual machine 404 results in no unwanted effects being propagated onto the virtual machine 404, the virtual machine 404 may transmit the request to the target computer 406. The target computer 406 may thus be permitted to receive the request. Furthermore, the target computer 406 may also be permitted to respond to the request.

Figure 5:
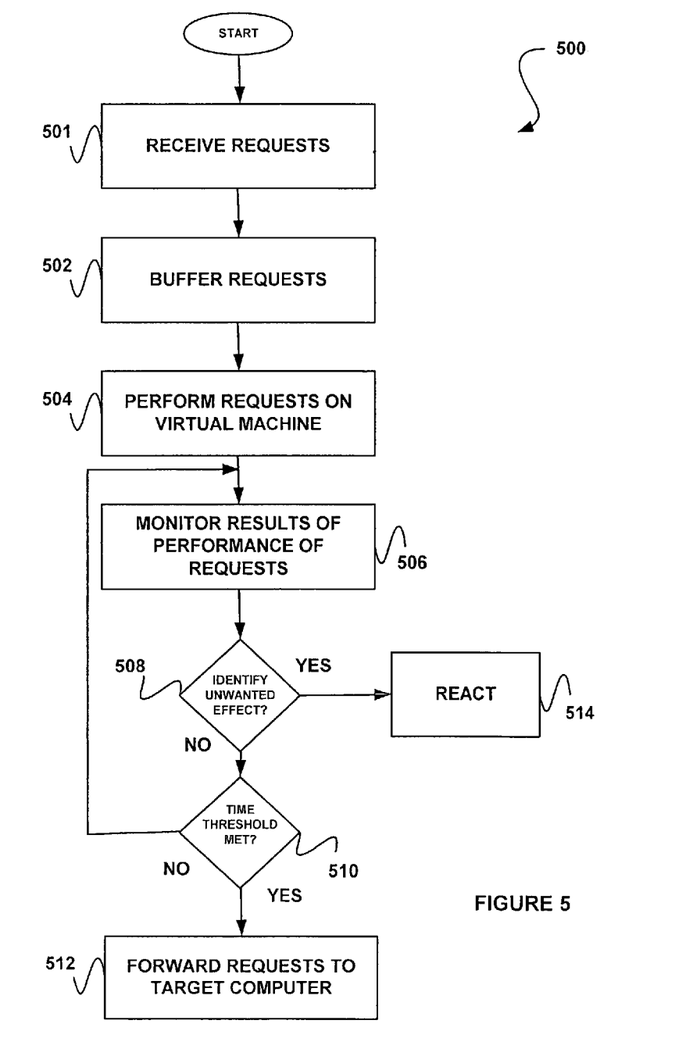
FIG. 5 shows a method for detecting unwanted effects utilizing a virtual machine, in accordance with yet another embodiment.

FIG. 5 shows a method 500 for detecting unwanted effects utilizing a virtual machine, in accordance with yet another embodiment. As an option, the method 500 may be implemented in the context of the architecture and environment of FIGS. 1-4. Of course, however, the method 500 may be carried out in any desired environment. It should also be noted that the aforementioned definitions may apply during the present description.

As shown in operation 501, requests are received. The requests may be received at a virtual machine, where any one or more of the following operations may be performed. The requests are also buffered, as shown in operation 502. In particular, each request may be stored in a buffer as it is received. As an option, the requests may be buffered in cache. As another option, the requests may be buffered in a queue.

Still yet, only predetermined types of requests may be stored in the buffer. Such predetermined types may be identified in a database of types. For example, requests of a type that are capable of generating unwanted effects may be stored in the buffer, whereas requests of a type that are not capable of generating unwanted effects may not be stored in the buffer.

Further, requests of a type that are not (or less likely) capable of generating unwanted effects may be automatically transmitted to associated target computers. In one embodiment, DNS requests may be a type that is stored in the buffer, while simple file requests may not. In this way, overall latency of transmitting requests may be reduced.

In addition, the requests are performed on the virtual machine. Note operation 504. Thus, the virtual machine may include a system that is capable of performing actions in response to such requests. Specifically, the requests may be resolved on the virtual machine. Just by way of example, if the request is a DNS request, the virtual machine may resolve DNS server names for Internet use.

Further, results of the performance of the requests may be monitored, as in operation 506. Thus, the performed actions may be monitored. In one embodiment, the results may be monitored for unwanted effects. For example, the results may be monitored utilizing behavioral IPS detection, signatures, heuristics and/or any other technique capable of monitoring requests for unwanted effects.

It may next be determined whether any unwanted effect(s) has been identified, as shown in decision 508. If any unwanted effects have been identified, a reaction to the unwanted effects may be performed, as shown in operation 514. Such reaction may include any reaction capable of being taken with respect to the unwanted effects and/or request. Examples of such reactions will be described in further detail with respect to FIG. 6.

If unwanted effects have not been identified, it may be determined whether a time threshold has been met. Note decision 510. The time threshold may include a predetermined time threshold, such as a default time threshold or a configurable time threshold. For example, the time threshold may include a time period of less than one second. Of course, however, the time threshold may include any desired time period.

As an option, the time threshold may be configured according to request type. Thus, requests of a type that may require more time to be processed may be associated with greater time thresholds than requests of a type that may require less time to be processed. As another option, the time threshold may be based on an algorithm.

If it is determined in decision 510 that the time threshold has not been met, the method 500 may continue to monitor results of the performance of the requests (operation 506). If, however, it is determined in decision 510 that the time threshold has been met, the request may be forwarded to an appropriate target computer. Specifically, the request may be dequeued and transmitted to a designated target computer. Thus, for a period of time specified by a time threshold, it may be determine whether a request is associated with unwanted effects. In this way, such unwanted effects may be prevented from being propagated to a target computer, while preserving performance with respect to any responses to the requests.

Figure 6:
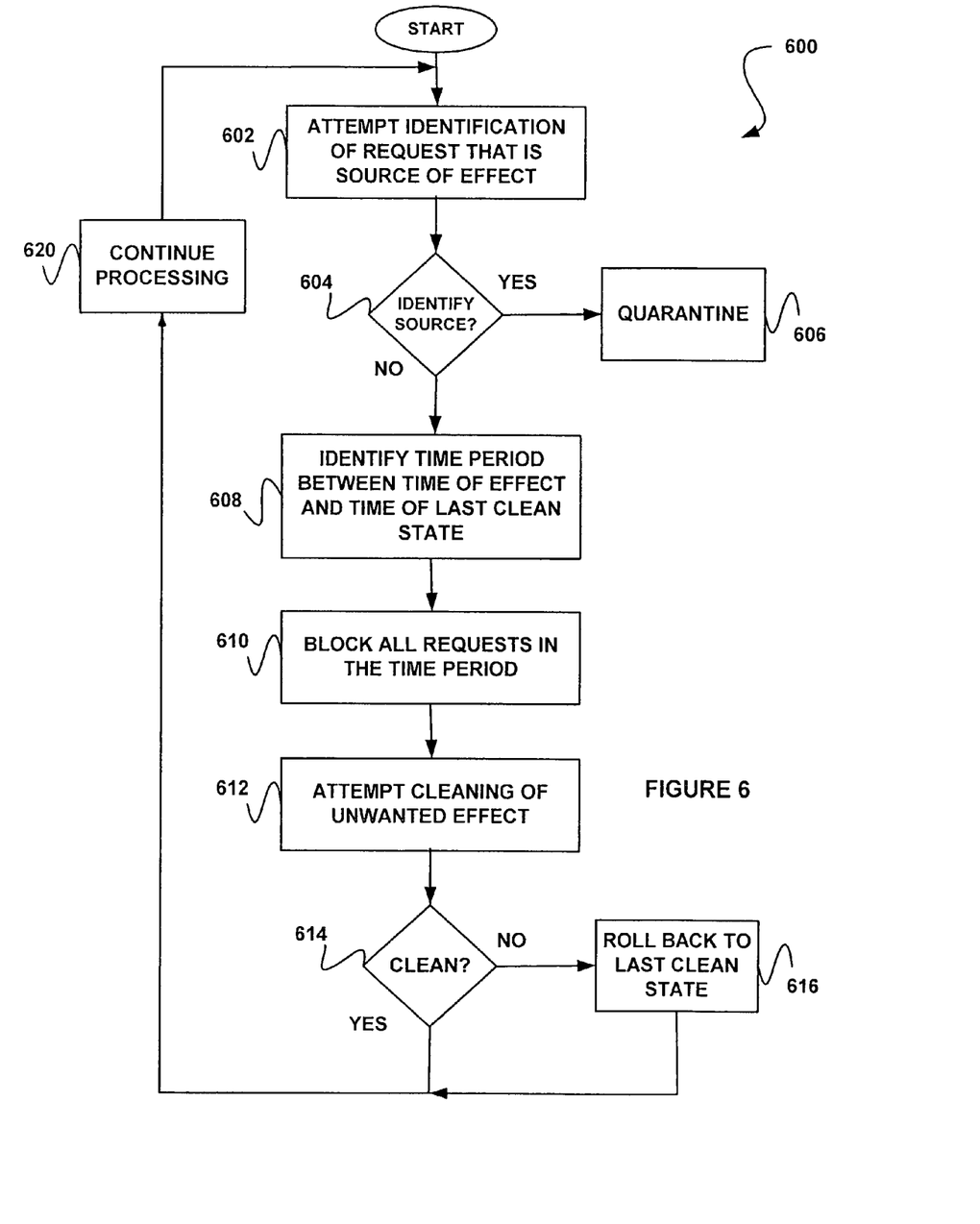
FIG. 6 shows a method for reacting to detected unwanted effects, in accordance with still yet another embodiment.

FIG. 6 shows a method 600 for reacting to detected unwanted effects, in accordance with still yet another embodiment. As an option, the method 600 may be implemented in the context of the architecture and environment of FIGS. 1-5. Of course, however, the method 600 may be carried out in any desired environment. It should also be noted that the aforementioned definitions may apply during the present description.

As shown in operation 602, an attempt to identify a request that is the source of a detected unwanted effect is made. The identification may be made in any manner capable of identifying a request associated with an unwanted effect. In various embodiments, an attempt may be made to correlate the unwanted effect with the associated request by correlating the respective timing of the request/effect, using information of known correlations between known request types and unwanted effects, etc. For example, if out of three requests the first request is known to typically propagate the identified unwanted effect, such first request is identified in operation 602.

It is then determined in decision 604 whether the source request has been identified. If the source request has been identified, the request may be quarantined, as shown in operation 606. As an option, the request may be removed from a buffer, such as the buffer described above with respect to FIG. 5, and may be stored in quarantine. In this way, the request may be prevented from being transmitted to a target computer. Still yet, any external computer determined to be the physical point of origination of the identified request may be quarantined, blacklisted, etc.

If the source request has not been identified per decision 604, a time period between the time of the unwanted effect and a time of a last clean state may be identified. Note operation 608. Specifically, the last clean state may include a most recent instance when a virtual machine processing the request was not propagated with unwanted effects. Further, in other embodiments, such last clean state may be identified utilizing snapshots taken of the virtual machine, for example.

Still yet, all requests within the identified time period may be blocked, as shown in operation 610. In particular, any requests processed by the virtual machine within the identified time period (and currently buffered) may be prevented from being transmitted to associated target computers. For example, such requests may be quarantined. Thus, since the particular tainted request can not necessarily be identified, any potential tainted requests may thus be blocked to ensure that any potential propagation to the target computer is precluded.

In addition, an attempt to clean any unwanted effects propagated onto the virtual machine may be made, as in operation 612. In one embodiment, the attempt may include an attempt to unroll any unwanted effects of the identified source request. Specifically, rollback technology may be utilized to selectively undo the unwanted effects. If it is determined in operation 614 that the attempt to clean the unwanted effects was successful, processing of requests may continue. Note operation 620.

If, however, it is determined in operation 614 that the attempt to clean the unwanted effects was not successful, the virtual machine may be rolled back to a last known clean state, as in operation 616. The last clean state may include any most recent instance of a snapshot in which the virtual machine was clean of any unwanted effects. Once the virtual machine is reverted to a clean state, processing of the requests may continue, as shown in operation 620.

In one specific embodiment, which is just by way of example, a DNS query may be loaded by an attacker to cause a buffer overflow attack. The DNS query may be a server request that is transmitted to a target computer. If the request is not detected by any front-line defenses present (e.g. a traditional firewall product, virus scanner, etc.), the request may be intercepted by the aforementioned virtual machine.

The query may then be queued and processed by the virtual machine. Specifically, the processing may trigger the buffer overflow exploit. The exploit may then be detected utilizing any desired detection techniques. Further, the virtual machine may attempt to determine the particular request that triggered the exploit.

If the virtual machine can trace the exploit to the exploit-laden DNS query, the query may be prevented from being propagated to the target computer. In particular, the identified query may be removed from the queue of pending server requests. Thus, other server requests may be prevented from being affected.

If the virtual machine cannot trace the exploit to the particular DNS query, the virtual machine may identify the time the exploit was observed and the time the last good virtual machine state was observed. Server requests in such time window may be prevented from being transmitted to the target computer, such that the target computer may be protected from any potentially affected requests. The DNS query may still be queued such that it may also be identified as being within the time window. Thus, the DNS query may be prevented from being transmitted to the target computer.

Next, the virtual machine may attempt to roll back any damage done by the DNS query to the virtual machine. If the rollback is successful, the virtual machine may continue processing server requests. Otherwise, the virtual machine may be halted and restored to the last known clean snapshot, such that processing of server requests may continue on a clean virtual machine.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by sub-national groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into the cyber-frameworks of the foregoing potential targets, terrorism may be countered by detecting unwanted effects associated with incoming requests, etc., which may be used to combat cyber-terrorism.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method to detect unwanted effects from the performance of a requested act, comprising:
   intercepting, by a first computer providing a virtual machine environment, a first request to perform an act at a target computer, the first computer comprising a hardware processor;
   performing the requested act within the virtual machine environment;
   monitoring the performed act to identify an effect;
   intercepting, by the first computer, one or more additional requests to perform a second act at a second target computer;
   performing the one or more additional requested acts within the virtual machine environment;
   identifying an unwanted effect based on performing the one or more additional requests to perform the second act within the virtual machine environment;
   attempting to identify a specific request from the one or more additional requests that resulted in the unwanted effect by associating a timing of the specific request and the identified unwanted based upon known correlations between request types and unwanted effects;
   identifying a time period between a last clean state of the virtual machine environment and the unwanted effect when the specific request that resulted in the unwanted effect cannot be identified;
   blocking all requests of the one or more additional requests intercepted during the identified time period; and
   forwarding the first request to perform the act to the target computer when the identified effect is not an unwanted effect.

2. The method of claim 1, wherein the first computer comprises an intermediate computer that is networked between the target computer and a computer from which the request is received.

3. The method of claim 1, wherein the first computer providing the virtual machine environment comprises the target computer.

4. The method of claim 1, wherein only predetermined types of requests are intercepted.

5. The method of claim 1, wherein requests of a type predetermined to be unlikely to result in unwanted effects are automatically forwarded to the target computer.

6. The method of claim 1, wherein the act of monitoring the performed act to identify an unwanted effect comprises utilizing at least one of signatures, heuristics, and behavioral intrusion prevention techniques.

7. The method of claim 1, further comprising delaying forwarding the request to perform the act to the target computer for a certain time period to allow time to identify an unwanted effect.

8. The method of claim 7, wherein the time period is dependent upon a type of the request.

9. The method of claim 1, further comprising identifying a source of the specific request that resulted in the unwanted effect.

10. The method of claim 9, further comprising blocking all requests originating from the source of the specific request.

11. The method of claim 1, wherein the last clean state of the virtual machine is identified utilizing a snapshot of the virtual machine.

12. The method of claim 1 wherein the second target computer and the first target computer are different computers.

13. A non-transitory computer program storage device, comprising computer code for causing a processor associated with a first computer providing a virtual machine environment to:
- intercept a first request to perform an act at a target computer;
- perform the requested act within the virtual machine environment;
- monitor the performed act to identify an effect;
- intercept one or more additional requests to perform a second act at a second target computer;
- perform the one or more additional requested acts within the virtual machine environment;
- identify an unwanted effect based on performing the one or more additional requests to perform the second act within the virtual machine environment;
- attempt to identify a specific request from the one or more additional requests that resulted in the unwanted effect by associating a timing of the specific request and the identified unwanted based upon known correlations between request types and unwanted effects;
- identify a time period between a last clean state of the virtual machine environment and the unwanted effect when the specific request that resulted in the unwanted effect cannot be identified;
- block all requests of the one or more additional requests intercepted during the identified time period; and
- forward the first request to perform the act to the target computer when the identified effect is not an unwanted effect.

14. The non-transitory computer program storage device of claim 13, wherein only predetermined types of requests are intercepted.

15. The non-transitory computer program storage device of claim 13, wherein requests of a type predetermined to be unlikely to result in unwanted effects are automatically forwarded to the target computer.

16. The non-transitory computer program storage device of claim 13, further comprising identifying a source of the specific request that resulted in the unwanted effect.

17. The non-transitory computer program storage device of claim 16, further comprising blocking all requests originating from the source of the specific request.

18. The non-transitory computer program storage device of claim 13, wherein the last clean state of the virtual machine is identified utilizing a snapshot of the virtual machine.

19. The non-transitory computer program storage device of claim 13, wherein the second target computer and the first target computer are different computers.

20. A system, comprising:
- a memory;
- a virtual machine environment; and
- a hardware processor operatively coupled to the memory, the hardware processor adapted to execute program code stored in the memory to:
  - intercept a first request to perform an act at a target computer;
  - perform the requested act within the virtual machine environment;
  - monitor the performed act to identify an effect;
  - intercept one or more additional requests to perform a second act at a second target computer;
  - perform the one or more additional requested acts within the virtual machine environment;
  - identify an unwanted effect based on performing the one or more additional requests to perform the second act within the virtual machine environment;
  - attempt to identify a specific request from the one or more additional requests that resulted in the unwanted effect by associating a timing of the specific request and the identified unwanted based upon known correlations between request types and unwanted effects;
  - identify a time period between a last clean state of the virtual machine environment and the unwanted effect when the specific request that resulted in the unwanted effect cannot be identified;
  - block all requests of the one or more additional requests intercepted during the identified time period; and
  - forward the first request to perform the act to the target computer when the identified act is not an unwanted effect.

* * * * *